United States Patent [19]

Franz et al.

[11] Patent Number: 5,540,769
[45] Date of Patent: Jul. 30, 1996

[54] PLATELET-LIKE COLORED PIGMENTS AND PROCESS FOR PRODUCING THE SAME

[75] Inventors: Klaus-Dieter Franz, Kelkheim; Klaus Ambrosius, Dieburg; Stefan Wilhelm, Heppenheim, all of Germany; Katsuhisa Nitta, Fukushima, Japan

[73] Assignee: Merck Patent Gesellschaft Mit Beschrankter Haftung, Darmstadt, Germany

[21] Appl. No.: 307,695

[22] PCT Filed: Mar. 16, 1993

[86] PCT No.: PCT/EP93/00617

§ 371 Date: Sep. 23, 1994

§ 102(e) Date: Sep. 23, 1994

[87] PCT Pub. No.: WO93/19131

PCT Pub. Date: Sep. 30, 1993

[30] Foreign Application Priority Data

Mar. 26, 1992 [DE] Germany .................. 92 105 213.0

[51] Int. Cl.$^6$ .................. C04B 14/04; C04B 14/20; C04B 14/10; C04B 14/22
[52] U.S. Cl. .................. 106/415; 106/436; 106/442; 106/DIG. 3; 428/363; 428/402
[58] Field of Search .................. 106/415, 417, 106/436, 442, DIG. 3; 428/363, 402

[56] References Cited

U.S. PATENT DOCUMENTS

| | | | |
|---|---|---|---|
| 4,450,012 | 5/1984 | Messer et al. | 106/442 |
| 4,623,396 | 11/1986 | Kimura et al. | 106/417 |
| 4,828,623 | 5/1989 | Nitta et al. | 106/417 |
| 4,948,631 | 8/1990 | Ostertag et al. | 106/417 |
| 5,118,352 | 6/1992 | Noguchi | 106/415 |

FOREIGN PATENT DOCUMENTS

| | | |
|---|---|---|
| 0332071 | 9/1989 | European Pat. Off. . |
| 0354374 | 2/1990 | European Pat. Off. . |
| 3433657 | 3/1985 | Germany . |
| 62-295979 | 6/1989 | Japan . |

OTHER PUBLICATIONS

Abstract of JP 58 164 653 Sep. 29, 1983.
Abstract of JP 3,079,673. Mar. 31, 1992.
Abstract of JP 59 126 468. Jul. 21, 1984.
Database WPIL, Section Ch, Week 8345, Derwent Publications Ltd., London, GB; Class E32, AN 83–810901 (abstract of JP-A-58 164 653). Sep. 29, 1983.

Primary Examiner—Karl Group
Assistant Examiner—Michael Marcheschi
Attorney, Agent, or Firm—Millen, White, Zelano & Branigan, P.C.

[57] ABSTRACT

Platelet-shaped colored pigments containing titanium dioxide, one or more suboxides of titanium and an oxide or oxides of one or more metals other than titanium or nonmetals and a process for the preparation thereof is disclosed.

16 Claims, 3 Drawing Sheets

PLATELET-LIKE COLORED PIGMENTS AND PROCESS FOR PRODUCING THE SAME

CROSS REFERENCE TO RELATED APPLICATION

This is a 371 of PCT/EP93/00617, filed Mar. 16, 1993.

The present invention relates to a platelet-shaped colored pigment comprising titanium dioxide, one or more suboxides of titanium, and an oxide or oxides of one or more different metals and/or non metals.

BACKGROUND OF THE INVENTION

There is a continuously increasing demand for pigments with intense pearlescent color and/or metallic luster in the field of paints, coatings, inks, plastics, cosmetics and especially for exterior coatings. Therefore, the development in the field of pigments aims at lustrous and hiding pigments which can be new effect pigments or replace the metallic pigments such as aluminum flakes with their known disadvantages. It is known that coatings of $TiO_2$-layers on platelet-shaped substrates produce the so-called pearlescent effect. For this kind of pigments it is possible to control the interference color by changing the thickness of the $TiO_2$-layer. It is known from DE 3433657, U.S. Pat. No. 4,623,396 and EP 0332071 to use suboxides, e.g. suboxides of titanium, for the coating of platelet-shaped substrates whereby for the reduction of the $TiO_2$ ammonia gas is used.

However, the reduction of solid particles by a reducing gas is not suitable for an industrial production, because the color of the product as a function of the degree of reduction is difficult to control. It is dependent on the size of the particles, the temperature, the gas flow and the time of treatment. Furthermore special facilities for dangerous or toxic gas are necessary. It is also known that such suboxides provide functional properties such as electric conductivity.

JP-A-1-158077 discloses a pigment consisting of a titanium oxide layer containing a dark color region on a mica core and a color tone adjusting layer as covering layer comprising at least one of silicon oxide, aluminum oxide and zinc oxide or a composite oxide thereof. The dark color region is composed of a dark color metal oxide, such as titanium oxide or iron oxide of lower order, of titanium nitride, titanium oxide or carbon black.

The pigment is manufactured in a first step by heating and reducing titanium dioxide-coated mica flakes at a temperature of from 500° C. to 1000° C. in a reducing gas; or by blending titanium dioxide-coated mica flakes with titanium metal and heating the resulting blend in a vacuum at a temperature of from 500° to 1000° C. for a long time of more than 6 hours. The covering layer is deposited in a second step in an aqueous medium by precipitating of silicon dioxide hydrate on the first layer containing the titanium suboxides and drying or firing the pigment. This additional coating improves heat stability of the suboxide containing layer. However, the functional properties such as electric conductivity of the first layer is shielded by this second layer. The pigment has the disadvantage that it is manufactured in a complicated two-step process which raises the price. The reduction in vacuum requires expensive facilities and complicated operation and high temperature and longer reaction time causes low production efficiency. Furthermore the used titanium metal is expensive.

SUMMARY OF THE INVENTION

Accordingly, it is an object of this invention to provide platelet-shaped colored pigments having improved heat stability without losing the functional properties of colored layers which are producible in a simple one-step process.

This object is solved according to the present invention by a platelet-shaped colored pigment on the basis of a platelet-shaped substrate which is covered by a coating layer containing $TiO_2$, one or more suboxides of titanium and an oxide or oxides of one or more different metals and/or non metals. The concentration of said titanium oxides in the coating layer is maximum in the proximity of the substrate surface and gradually decreases towards the pigment surface and the concentration of said oxide or oxides of one or more different metals and/or non metals is maximum at the pigment surface and gradually decreases towards the substrate surface whereby mixed phases of these oxides exist inside the coating layer.

The different elements are preferably selected from alkali metals, alkaline earth metals, B, Al, Si, Zn or Fe. Furthermore all other elements with sufficient reactivity can be used.

The amount of the one or more different metals and/or non metals is from 1 to 50% by weight, preferably from 2 to 30% by weight, relative to the amount of titanium in the pigment.

Furthermore this object is solved by a process for producing platelet-shaped colored pigments by mixing a platelet-shaped substrate coated with $TiO_2$ with at least one solid reducing agent, preferably an alkaline earth metal B, Al, Si, Zn, Fe, LiH, $CaH_2$, $Al_4C_3$, $Mg_2Si$, $MgSi_2$, $Ca_2Si$ or $CaSi_2$ and heating the mixture in a non-oxidative gas atmosphere at a temperature of more than 600° C. for more than 10 minutes.

As starting materials platelet-shaped substrates like mica, kaolin or glass platelets which optionally may be coated with one or more metal oxide layers, or metal or metal oxide platelets coated with $TiO_2$ are used. The particle sizes of the substrates are 1 to 500 μm in diameter and 0.1 to 1 μm in thickness. The materials are coated with $TiO_2$ according to processes well-known in the art and described for example in U.S. Pat. No. 3,553,001.

The $TiO_2$-layer has a thickness in the range of from 10 to 1000 nm, preferably from 40 to 500 nm. The reduction reaction takes place in a non-oxidative gas atmosphere such as $N_2$, Ar, He, $CO_2$, $C_xH_y$, $H_2$, $NH_3$. $N_2$ or Ar are preferred. In case of $N_2$ or $NH_3$, TiN or TiON may be formed in addition to $TiO_{2-x}$. It forms mixed solid suboxides or oxide bronzes on the platelet-shaped substrates as soft solid powders at temperatures of more than 600° C., preferably in the range from 700° to 1100° C. for more than 10 minutes, preferably for 15 minutes to 60 minutes. Some examples will illustrate the reactions:

M = mica

As reducing agent fine powdered elements like for example Al, Si, Mg, Ca and B or combinations thereof are particularly preferred. Furthermore alloys of metals or metal borides, carbides and silicides can be used.

Well-known reducing agents like the alkali metals may be used in liquid or gas phase.

Other reducing agents are hydrides like LiH or $CaH_2$.

In addition, combinations of these reducing agents with each other are possible.

The $TiO_2$-pigment and the reducing agent are mixed in a ratio from 200:1 to 5:1 preferably from 100:1 to 10:1. The obtained pigments exhibit strong pearlescent color and/or metallic luster.

The color effect of the pigments can be controlled by changing the particle size of the platelet-shaped substrate (smaller particles lead to a soft silky luster, larger particles lead to a glittering luster), the thickness of the Ti-oxides layer (interference color), the kind of the solid reducing agent (low reduction potential yields grey to blueish black, high reduction potential yields black to yellowish black) and the amount of the solid reducing agent.

The reduction reaction is accelerated in the presence of a halide, preferably a chloride as pointed out in Table 1. LiCl, NaCl, KCl, $MgCl_2$, $CaCl_2$, $CuCl_2$, $CrCl_3$, $MnCl_2$, $FeCl_2$, $FeCl_3$, $COCl_2$, $NiCl_2$ or $CeCl_3$ are preferred. The reaction temperature can be reduced in the presence of chloride by 150° to 300° C. In example I the calcining temperature has to be 1000° C. without the admixture of chloride in order to reach a reaction. It is reduced to 840° C. by admixing of $CaCl_2$.

The amounts of the halide can vary from 0.1 to 40%, preferably from 0.5 to 10% relative to the platelet-shaped substrate coated with $TiO_2$.

The products show a depth profile regarding the distribution of titanium and the one or more different metals and/or non metals inside the coating layer.

A pigment which is used in an organic solvent system such as paint or ink is often required to have a certain level of conductivity in order to avoid the danger of explosion by electrostatic spark. Table 2 shows the temperature resistance and the electroconductivity of the known pigment after the first process step (reduction of $TiO_2$-layer with Ti metal; PM 21-2) and after the second process step (precipitation of $Si_2$; PM 21-3) and of the pigment according to the present invention (PM 21-1). The pigment according to the present invention has a significantly better electroconductivity than the pigment produced by the two-step process. Additional coating with $SiO_2$ (PM 21-3) reduces the conductivity.

Furthermore the pigments according to the present invention show a better application behavior. That means better results regarding the humidity test in car paint application and regarding the photoactivity test in out-door application. Photoactivity test results are shown in Table 3. The pigment according to the invention has been compared with known pigments.

If desired the pigment can be provided with high magneticity as shown in Table 4.

The invention will now be described more specifically with reference to examples thereof, as well as comparative examples, which are not intended to limit the scope of the invention.

EXAMPLE 1

15 g of a $TiO_2$-coated mica powder, particle size distribution 5–25 μm, exhibiting white mass tone with white reflection color (Iriodin® 120; produced by E. Merck) and 1.5 g of Si powder, particle size <150 m (from E. Merck), was mixed thoroughly in a 500 ml plastic bottle.

The mixture was put into a quartz boat.

The boat was placed inside a quartz tube (inner diameter 5 cm, length 100 cm). Both ends of this tube were equipped with gas pipes, one for introducing gas and the other for exhausting gas.

Then blowing of $N_2$ gas into this tube was started at room temperature with the flow rate of 0.25 l/min.

After 15 min., the tube was placed into an oven which was kept at 1000° C., and maintained for 30 minutes.

The tube was put out of the oven and let cool down. Until the tube was cooled down, the blowing of $N_2$ gas was maintained. The calcined powder was washed with water and dried at 120° C. over night, and then the powder was passed through a 40 μm sieve.

To evaluate the color characteristics of the pigment produced according to the invention, 0.9 g of each pigment sample is worked in 53.6 g of an acrylic modified nitrocellulose lacquer. After homogenizing with a propeller mixer at 1000 rpm for 10 min the dispersion is allowed to stand for one hour to remove air bubbles. Then the pigmented lacquer is coated with an applicator (500 μm wet film thickness) on a block and white card.

The visual evaluation of the color is expressed as masstone and interference color. The masstone color is the observation out of luster (45°/0°) and the interference color is the observation at reflection angle (22.5°/22.5°).

The CIE Lab color coordinates are measured with Hunter Lab Color Meter model D-25 under the conditions of 45°/0° with white background and 22.5°/22.5° with black background. The obtained powder exhibits blue black masstone with blue interference color (coloristics see also Table 4).

By ESCA measurement with combination of Ar sputtering technique, depth distribution of Si atoms in the coated layer of this pigment was determined.

Figure 1:
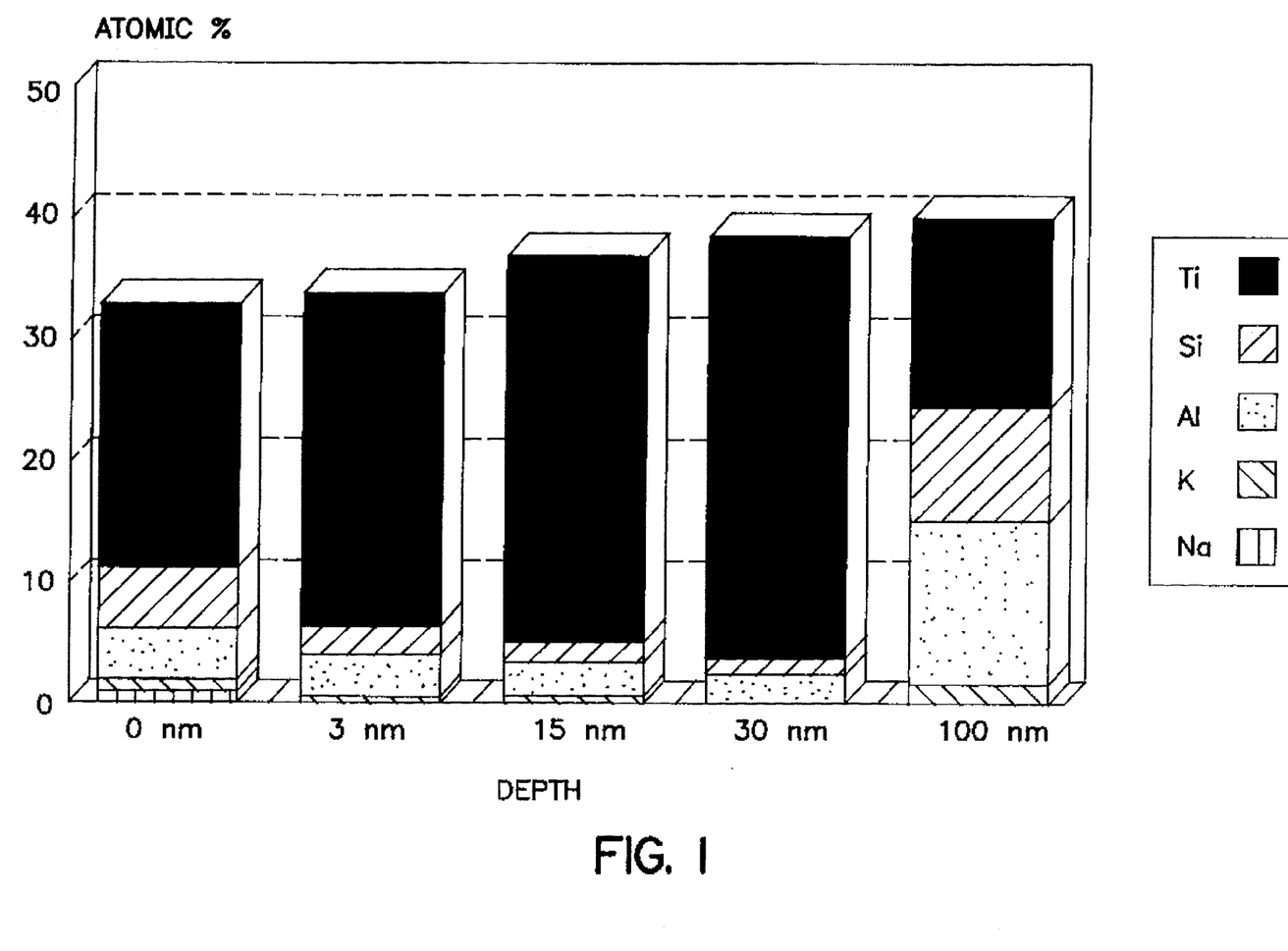
FIG. 1 shows a depth profile of Iriodin 120, a pearlescent $TiO_2$-pigment manufactured by E. MERCK. The concentration of titanium on the pigment surface is 22 atomic % contrary to the silicon concentration which is only about 5 atomic %.
Figure 2:
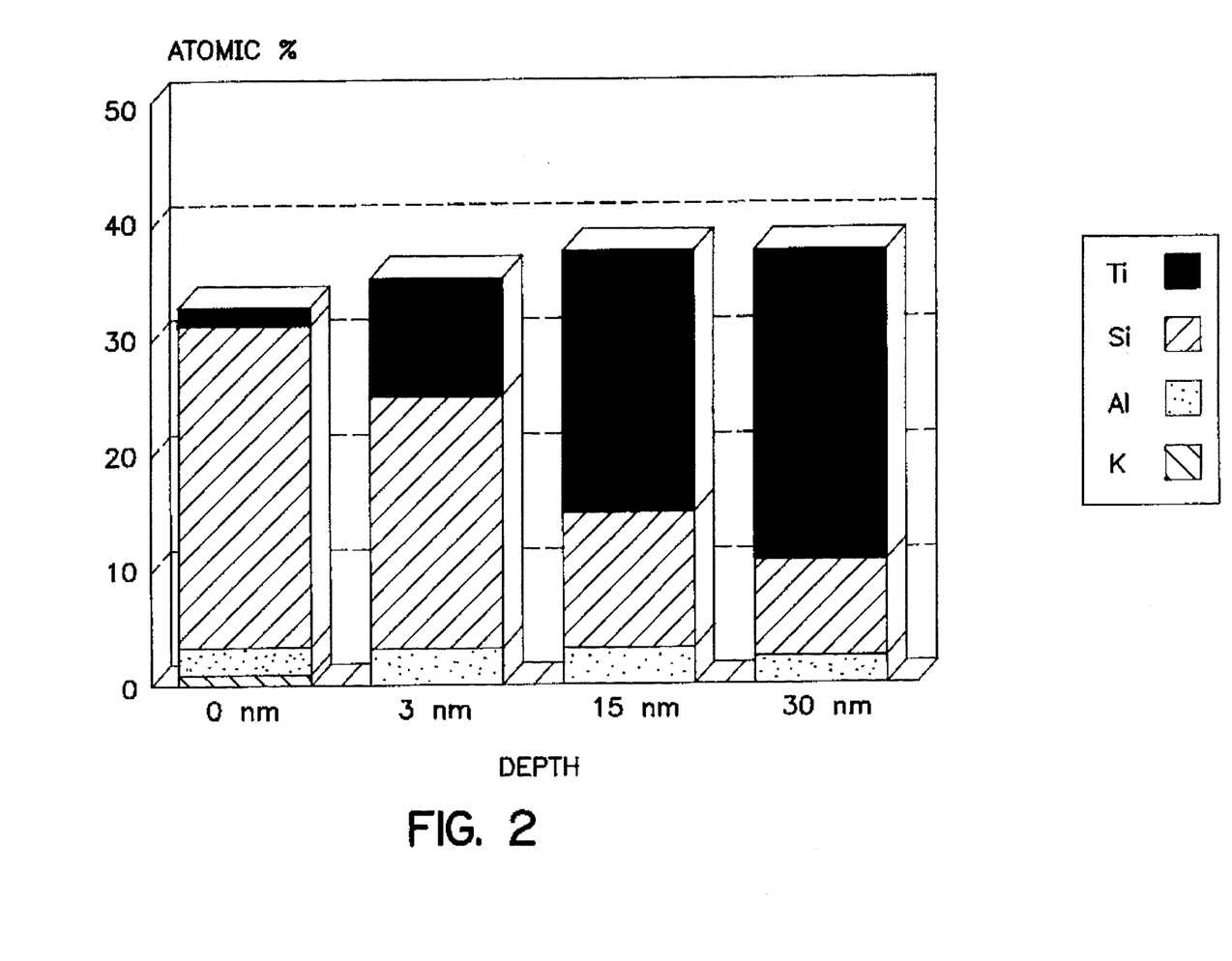
FIG. 2 shows a depth profile of the same pigment after the reduction with metallic silicon according to example 1. The titanium concentration is decreased to 2 atomic % and the silicon concentration is increased to more than 28 atomic %. During the reduction reaction metallic silicon penetrates into the $TiO_2$-layer and is oxidized to $Si_2$. The silicon concentration decreases continously in the direction to the substrate and is about 9% in a depth of 30 nm.

As shown above in FIG. 2, Si atoms penetrate into Ti-oxide layer more than 30 nm and the distribution of Si atom shows gradation of concentration along the depth. X-ray diffraction of this powder indicates the presence of $\gamma Ti_3O_5$ and $SiO_2$ (quartz).

EXAMPLE 2

100 g of a $TiO_2$-coated mica powder, particle size distribution 5–25 μm, exhibiting reddish white mass tone with green interference reflection color (Iriodin®231; produced by E. Merck), 3 g of the same Si powder as in Example 1 and 1 g of $CaCl_2$ were mixed throughly in a 3 l plastic bottle. This mixture was calcined at 800° C. for 30 minutes under $N_2$ gas flow of 3.0 l/min. with the same manner as in Example 1. The calcined powder was washed with water and dried at 120° C. overnight, and then the powder was passed through a 40 μm sieve.

The obtained powder exhibits bluegreen black masstone with bluegreen interference color. This sample showed 7.5 kΩ. cm of powder conductivity which is enough to avoid electrostatic spark (see Table 2).

Comparative Example 1

This comparative example demonstrates the reduction with metallic titanium according to JP-A-1-158 077 as the first step of the two-step process.

100 g of the same $TiO_2$-coated mica as in Example 2 and 5 g of Ti powder (particle size 150 gm, from E. Merck) were mixed throughly in a 3 l plastic bottle.

This mixture was calcined at 1000° C. for 30 minutes under $N_2$ gas flow of 0.25 l/min. with the Same manner as in Example 1. The calcined powder was washed with water and dried at 120° C. overnight, and then the powder was passed through a 40 μm sieve.

The obtained pigment exhibits bluegreen black mass tone with blue green interference color.

The sample showed a powder conductivity of 31.5 MΩ.cm. Consequently, the pigment according to the present invention has a significantly better electroconductivity than the comparison pigment.

Comparative Example 2

As the second step of the two-step process described in JP-A-1-158 007 silicon oxide hydrate was deposited on the surface of the pigment obtained according to Comparative Example 1.

50 g of the pigment was dispersed into 500 ml of deionized water with stirring. During the reaction the stirring was maintained. The dispersion was heated up to 90° C. and the pH was adjusted by adding 5 wt % NaOH aq. solution. To this dispersion 75 ml of 10 wt % $Na_2SiO_3$ aq. solution was added at the rate of 2 ml/min. While keeping the pH at 9 by simultaneous addition of 1N HCl aq. solution. 62 ml of 1N HCl aq. solution was needed.

The temperature and stirring were maintained for an additional hour and then the mixture was cooled. The solid was filtered, washed with water and dried at 200° C. overnight. The obtained pigment exhibits bluegreen black mass tone with bluegreen interference color.

Figure 3:
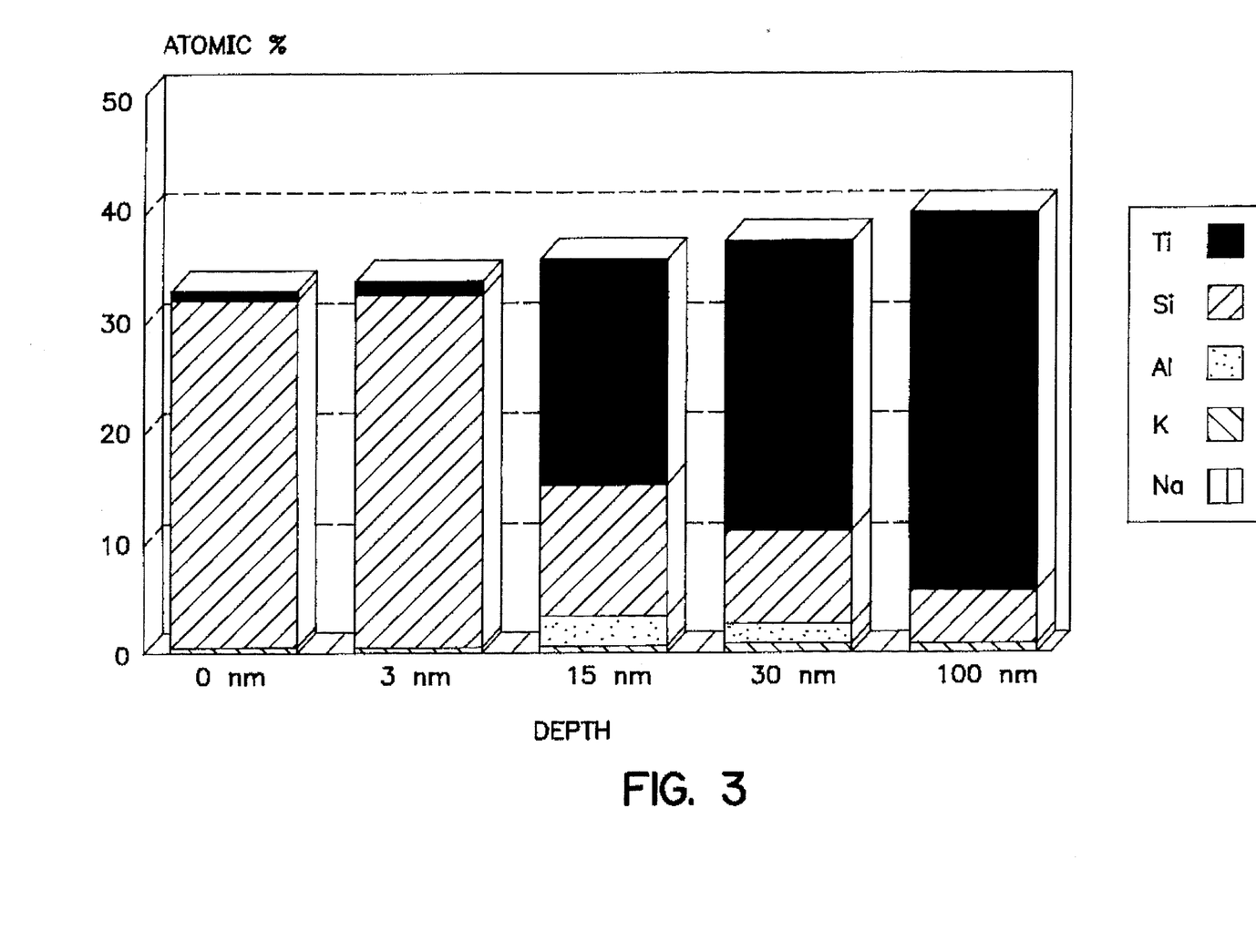
FIG. 3 shows the distribution of titanium and silicon in the pigment described in JP-A-1-158 077 beginning from the surface of the coating layer in direction to the substrate. The known pigment has been manufactured by a two-step process as described in the comparative examples 1 and 2. The two pigments show a very different structure. The known pigment has distinct layers. The top layer precipitated from an aqueous medium containing approximately 100% of silicon dioxide is more than 3 nm thick. In contrary, the pigment according to the present invention does not possess any distinct layers. The concentration of the components in the coating layer is gradually changing with the depth of this layer.

ESCA analysis with combination of Ar sputtering technique indicates that a more than 3 nm thick silicon oxide layer, covers the titanium oxide layer (see FIG. 3).

The sample shows a powder conductivity of >125 MΩcm. This value makes clear that the conductivity of the first layer is shielded by the silicon oxide layer.

EXAMPLE 3–14

Mixtures of a $TiO_2$-coated mica pigment and a reducing agent and in some cases a chloride were prepared in the same manner as in Example 1. The ratio of the reactants is listed in Table 4. The mixtures were calcined under the conditions described in Table 4.

The calcined powders were washed with water, dried at 120° C. overnight and then passed through a 40 μm sieve.

The appearance colors and measured color values are listed in Table 4.

All of these Examples exhibit grey to dark color indicating the formation of suboxides by the reaction.

EXAMPLES 15–32

These Examples demonstrate the influence of halides which accelerate the reduction reaction and which make it possible to lower the reduction reaction temperature.

The samples were prepared in the same manner as in Example 1. The mixing ratios and the calcination conditions are listed in Table 4.

The color appearance and the measured values are described in Table 4.

The colors of the pigments in the Examples 16–19 are darker than the color of the pigment in Example 15. In this Example no halide was added. The darker color indicates the reduction reaction was accelerated.

The colors of the pigments in the Examples 20–28 are dark indicating a reduction reaction took place, but without a halide the reduction reaction does not take place at such low temperatures.

The Examples 29 to 32 show that with decreasing amount of the halide in the mixture the color of the pigment becomes lighter.

EXAMPLE 33

This Example demonstrates the production of a dark colored conductive pigment.

15 g of $TiO_2$-coated mica pigment (the same as in Example 1) and 3 g of an Al powder (particle size <250 μm, from E. Merck) was mixed in the same manner as in Example 1 and calcined at 1000° C. for 30 minutes under $N_2$ gas flow of 0.25 l/min.

The calcined material was washed with water, dried at 120° C. over night and passed through a 40 μm sieve.

The obtained pigment exhibits yellowish black mass tone with brown reflection color.

The X-ray diffraction of this pigment indicates the presence of $Ti_2O_3$, TiN (Osbornite syn) and $A_2O_3$.

The electroconductivity of this pigment was determined as 20 Ω.cm.

EXAMPLE 34

This Example demonstrates the production of a pigment with magnetic properties. 15 g of the same $TiO_2$-coated mica pigment as in Example 2, 1.35 g of the same Si powder as in Example 1 and 0.15 g of CaCl$_2$ were mixed in the same manner as in Example 1. The mixture was calcined at 1000° C. for 30 minutes under N$_2$ gas flow of 1.5 l/min.

The calcined material was washed with water, dried at 120° C. overnight and passed through a 40 μm sieve. The obtained pigment exhibits black mass tone with brown reflection color and magnetic properties.

TABLE 1

| Example No. | TiO$_2$ coated mica pig. | Reduction agent | Mixing ratio pig./red./chl. | Gas flow rate | Calcine temp. | Color masstone/ interference |
|---|---|---|---|---|---|---|
| I PM 11 | Ir. 123 | Si/CaCl$_2$ | 100/4/4 | N$_2$ 0.25 l/min | 840° C. | blue black/ blue |
| comparison | Ir. 123 | Si | 100/4 | N$_2$ 0.25 l/min | 840° C. | no reaction (white/white) |
| II PM 13-2 | Ir. 123 | Al/KCl | 100/1/0.25 | N$_2$ 0.25 l/min | 800° C. | grey/white |
| comparison | Ir. 123 | Al | 100/1 | N$_2$ 0.25 l/min | 800° C. | no reaction |
| III PM 12-4 | Ir. 123 | B/KCl | 100/1/0.25 | N$_2$ 0.25 l/min | 600° C. | light grey/ white |
| comparison | Ir. 123 | B | 100/1 | N$_2$ 0.25 l/min | 600° C. | no reaction |

Ir. means Iriodin ®, a trade name for interference pigments, manufactured by E. MERCK.

TABLE 2

| Sample | TiO$_2$ coated mica pigment | Reduction agent | Mixing ratio pig./red. | Process Gas flow rate | Process Calcine temp. | Electro-conductivity* |
|---|---|---|---|---|---|---|
| Example 2 (PM 21-1) | Ir. 231 | Si/CaCl$_2$ | 100/3/1 | N$_2$ 3 l/min. | 800° C. | 7.5 kΩ · cm |
| Comparative Example 1 (PM 21-2) | Ir. 231 | Ti | 100/5 | N$_2$ 0.25 l/min. | 1000° C. | 31.5 MΩ · cm |
| Comparative Example 2 (PM 21-3) | PM 21-2 is coated with SiO$_2$.nH$_2$O Na$_2$SiO$_3$ + HCl → SiO$_2$.nH$_2$O | | | | | >125 MΩ · cm |

*Specific resistance of pigment powder, resistance of pressed powder between two metal pistons in a tube with 10 kg/3 cm$^2$ was measured and calculated according to following formula:

$$R_{sp} = R \frac{A}{d}$$

($R_{sp}$: specific resistance [Ω · cm]); R: measured resistance [Ω]; A: cross-sectional area of a tube [cm$^2$]; d: thickness of powder layer [cm])

TABLE 3

| Sample | TiO$_2$ coated mica pig. | Reduction agent | Mixing ratio pig./red./chl. | Gas flow rate | Calcine temp. | Color masstone/ interference | Humidity[1] 16 h/66° C. | Photoactivity[2] UV lamp, 24 h |
|---|---|---|---|---|---|---|---|---|
| 1 | Ir. 103 | Mg | 100/3.8 | Ar 0.25 l/min | 800° C. | dark grey/ silver | A | B |
| 2 | Ir. 103 | Si/CaCl$_2$ | 100/2/0.5 | N$_2$ 3 l/min. | 900° C. | grey/silver | B | B |
| Ir. 103 | — | — | — | — | — | white/white | C | C |
| 3 | Ir. 123 | Si/B/KCl | 100/4/1/0.5 | N$_2$ 3 l/min. | 700° C. | dark grey/ silver | B | B |
| Ir. 123 | — | — | — | — | — | white/white | C | C |

[1] Test system 1-coat acrylic-melamine thermosetting paint. 4 wt % pigment content based on total paint.
[2] 1 phr pigment incorporated in Pb compound containing PVC plate.
rank
A: less degradation
B: fair
C: much degradation
Ir. means Iriodin ®, a trade name for interference pigments, manufactured by E. MERCK.

TABLE 4

| Example No. | Powder mixture | | | Calc. conditions | | Color masstone/ interference |
|---|---|---|---|---|---|---|
| | TiO₂ mica pig. | Reduction agent/ halide | Mixing ratio pig./red./ halide | Gas flow rate | Calcine temp. (30 min.) | |
| 1 (Be 462) | Ir. 120 | Si | 100/10 | N₂, 0.25 l/min. | 1000° C. | blue black/ blue |
| 2 (PM 21-1) | Ir. 231 | Si/CaCl₂ | 100/3/1 | N₂ 3.0 l/min. | 800° C. | bluegreen black/bluegreen |
| 3 (Be 454) | Ir. 120 | Al | 100/10 | N₂, 0.25 l/min. | 1000° C. | black/ reddish white |
| 4 (Be 564) | Ir. 120 | Mg | 100/10 | Ar, 0.25 l/min. | 800° C. | black/ silver |
| 5 (Hg 34) | Ir. 221 | B | 100/1 | N₂, 0.25 l/min. | 900° C. | blue black/ lilac |
| 6 (Hg 1) | Ir. 120 | Al₄C₃ | 100/5 | N₂, 0.25 l/min. | 1000° C. | blueish grey/silver |
| 7 (Hg 8) | Ir. 120 | Mg₂Si | 100/5 | N₂, 0.25 l/min. | 1000° C. | blueish grey/silver |
| 8 (Hg 14) | Ir. 120 | MgSi₂ | 100/5 | N₂, 0.25 l/min. | 1000° C. | blueish black/lilac |
| 9 (Hg 15) | Ir. 120 | Ca₂Si | 100/5 | N₂, 0.25 l/min. | 1000° C. | grey/silver |

| Example No. | Color meter values | | | | | | Electro- conductivity | Magnetivity |
|---|---|---|---|---|---|---|---|---|
| | 45°/0° white background | | | 22.5°/22.5° black background | | | | |
| | L | a | b | L | a | b | | |
| 1 (Be 462) | 13.2 | −1.3 | −7.4 | 38.8 | +4.6 | −15.5 | 3.0 kΩcm | None |
| 2 (PM 21-1) | — | — | — | — | — | — | 7.5 kΩcm | — |
| 3 (Be 454) | 13.6 | −0.5 | −0.8 | 37.7 | +3.8 | −0.9 | −1.3 kΩcm | Little |
| 4 (Be 564) | 18.8 | −0.6 | −1.0 | 41.6 | +2.4 | −2.2 | 1.8 MΩcm | Little |
| 5 (Hg 34) | 34.9 | −2.0 | −5.4 | 36.8 | +20.3 | −39.5 | 451 kΩcm | Little |
| 6 (Hg 1) | 27.1 | −2.9 | −7.9 | 59.2 | +0.5 | −13.1 | 30 kΩcm | Little |
| 7 (Hg 8) | 21.1 | −1.7 | −4.5 | 53.4 | +2.1 | −8.7 | 24.3 kΩcm | Much |
| 8 (Hg 14) | 12.3 | −0.3 | −3.6 | 37.6 | +3.9 | −8.5 | 12.2 kΩcm | Much |
| 9 (Hg 15) | 42.5 | −2.7 | −3.3 | 72.7 | +1.5 | −6.7 | 155 MΩcm | Much |

| Example No. | Powder mixture | | | Calc. conditions | | Color masstone/ interference |
|---|---|---|---|---|---|---|
| | TiO₂ mica pig. | Reduction agent/ halide | Mixing ratio pig./red./ halide | Gas flow rate | Calcine temp. (30 min.) | |
| 10 (Hg 7) | Ir. 120 | CaSi₂ | 100/5 | N₂, 0.25 l/min. | 1000° C. | blueish grey/silver |
| 11 (Hg 10) | Ir. 120 | LiH | 100/5 | N₂, 0.25 l/min. | 1000° C. | yellowish grey/silver |
| 12 (PM 30-1) | Ir. 123 | Fe/CaCl₂ | 100/5/5 | N₂, 3.0 l/min. | 800° C. | yellowish grey/silver |
| 13 (PM 30-5) | Ir. 123 | Zn/CaCl₂ | 100/5/5 | N₂, 3.0 l/min. | 600° C. | grey/silver |
| 14 (MK 24) | Ir. 123 | Si/B/KCl | 100/4/1/0.5 | N₂, 0.25 l/min. | 650° C. | grey/silver |
| 15 (Be 523) | Ir. 221 | Si | 100/10 | N₂, 4.0 l/min. | 1000° C. | yellowish grey/blue |
| 16 (Hg 29) | Ir. 221 | Si/LiCl | 100/9/1 | N₂, 1.5 l/min. | 1000° C. | darkblue/ darklilac |
| 17 (Hg 18) | Ir. 221 | Si/NaCl | 100/9/1 | N₂, 1.5 l/min. | 1000° C. | darkblue/ lilac |
| 18 (Hg 20) | Ir. 221 | Si/KCl | 100/9/1 | N₂, 1.5 l/min. | 1000° C. | darkblue/ lilac |

TABLE 4-continued

| Example No. | white background | | | black background | | | conductivity | Magnetivity |
|---|---|---|---|---|---|---|---|---|
| | L | a | b | L | a | b | tivity | |
| 10 (Hg 7) | 31.3 | −2.9 | −5.2 | 63.8 | +0.9 | −9.7 | 920 kΩcm | Little |
| 11 (Hg 10) | 49.8 | −0.3 | +6.0 | 72.4 | −2.1 | −2.8 | 80.8 MΩcm | Much |
| 12 (PM 30-1) | 54.6 | −0.6 | +6.7 | 80.1 | +1.8 | −3.1 | >628 MΩcm | Much |
| 13 (PM 30-5) | 59.4 | −1.2 | +4.9 | 84.6 | +2.2 | −4.9 | <628 MΩcm | None |
| 14 (MK 24) | 39.2 | −2.9 | −2.5 | 76.2 | +1.7 | −10.9 | 2.0 MΩcm | None |
| 15 (Be 523) | 52.5 | −2.6 | 2.2 | 23.8 | +0.8 | −17.0 | 60 MΩcm | None |
| 16 (Hg 29) | 23.0 | ±0.0 | −7.6 | 34.5 | +10.9 | −20.0 | 176 kΩcm | Little |
| 17 (Hg 18) | 24.5 | +0.2 | −8.2 | 25.3 | +18.5 | −28.4 | 45 kΩcm | Little |
| 18 (Hg 20) | 25.2 | ±0.0 | −7.8 | 36.0 | ±19.2 | −30.4 | 212 kΩcm | Little |

| Example No. | Powder mixture | | | Calc. conditions | | Color masstone/ interference |
|---|---|---|---|---|---|---|
| | TiO₂ mica pig. | Reduction agent/ halide | Mixing ratio pig./red./ halide | Gas flow rate | Calcine temp. (30 min.) | |
| 19 (Hg 17) | Ir. 221 | Si/CaCl₂ | 100/9/1 | N₂, 1.5 l/min. | 1000° C. | black/ darkgold |
| 20 (PM 20-1) | Ir. 123 | Si/MgCl₂ | 100/3/1.5 | N₂, 3.0 l/min. | 800° C. | bluegrey/ blue |
| 21 (PM 20-5) | Ir. 123 | Si/FeCl₂ | 100/3/1.5 | N₂, 3.0 l/min. | 800° C. | bluegrey/ blueish silver |
| 22 (PM 20-6) | Ir. 123 | Si/FeCl₃ | 100/3/1.5 | N₂, 3.0 l/min. | 800° C. | bluegrey/ blueish silver |
| 23 (PM 22-5) | Ir. 123 | Si/NiCl₂ | 100/3/1.5 | N₂, 3.0 l/min. | 800° C. | darkblue-grey/ blue |
| 24 (PM 22-6) | Ir. 123 | Si/CuCl₂ | 100/3/1.5 | N₂, 3.0 l/min. | 800° C. | grey/silver |
| 25 (PM 22-7) | Ir. 123 | Si/MnCl₂ | 100/3/1.5 | N₂, 3.0 l/min. | 800° C. | grey/silver |
| 26 (PM 22-8) | Ir. 123 | Si/CrCl₃ | 100/3/1.5 | N₂, 3.0 l/min. | 800° C. | blueish grey/ blueish silver |

| Example No. | Color meter values | | | | | | Electro- conductivity | Magnetivity |
|---|---|---|---|---|---|---|---|---|
| | 45°/0° white background | | | 22.5°/22.5° black background | | | tivity | |
| | L | a | b | L | a | b | | |
| 19 (Hg 17) | 11.7 | −1.1 | −0.1 | 32.4 | +2.1 | +1.7 | 28 kΩcm | Much |
| 20 (PM 20-1) | 127.7 | −2.6 | −8.5 | 49.7 | +1.9 | −17.4 | — | — |
| 21 (PM 20-5) | 26.8 | −2.9 | −8.1 | 59.6 | +1.1 | −17.0 | — | — |
| 22 (PM 20-6) | 29.9 | −3.2 | −7.8 | 61.9 | +1.0 | −16.5 | — | — |
| 23 (PM 22-5) | 18.4 | −1.7 | −7.7 | 44.9 | +3.0 | −16.9 | — | — |
| 24 (PM 22-6) | 24.7 | −3.0 | −8.4 | 54.2 | +1.5 | −18.7 | — | — |
| 25 (PM 22-7) | 27.9 | −3.1 | −8.6 | 60.0 | +1.2 | −18.2 | — | — |
| 26 (PM 22-8) | 25.2 | −2.9 | −9.2 | 56.0 | +1.4 | −19.0 | — | — |

| Example No. | Powder mixture | | | Calc. conditions | | Color masstone/ interference |
|---|---|---|---|---|---|---|
| | TiO₂ mica pig. | Reduction agent/ halide | Mixing ratio pig./red./ halide | Gas flow rate | Calcine temp. (30 min.) | |
| 27 (PM 29-3) | Ir. 123 | Si/CeCl₃ | 100/3/1.5 | N₂, 3.0 l/min. | 800° C. | grey/ blueish silver |
| 28 | Ir. 123 | Si/CoCl₃ | 100/3/1.5 | N₂, | 800° C. | darkblue- |

TABLE 4-continued

| Example No. | | | | | | | |
|---|---|---|---|---|---|---|---|
| (PM 29-6) | | | | 3.0 l/min. | | | grey/blue |
| 29 (PM 26-2) | Ir. 123 | Si/CaCl$_2$ | 100/2/10 | 3.0 l/min. | | 800° C. | blueish dark-grey/bluesilver |
| 30 (PM 26-3) | Ir. 123 | Si/CaCl$_2$ | 100/2/5 | 3.0 l/min. | | 800° C. | blueish dark-grey/bluesilver |
| 31 (PM 26-4) | Ir. 123 | Si/CaCl$_2$ | 100/2/2 | 3.0 l/min. | | 800° C. | blueish grey/blueish silver |
| 32 (PM 19-2) | Ir. 123 | Si/CaCl$_2$ | 100/3/0.5 | 3.0 l/min. | | 800° C. | lightgrey/blueish silver |

| | Color meter values | | | | | | Electro- | |
|---|---|---|---|---|---|---|---|---|
| | 45°/0° white background | | | 22.5°/22.5° black background | | | conductivity | |
| Example No. | L | a | b | L | a | b | tivity | Magnetivity |
| 27 (PM 29-3) | 27.1 | −3.1 | −8.6 | 59.1 | +1.0 | −16.3 | — | |
| 28 (PM 29-6) | 18.9 | −1.8 | −7.8 | 47.1 | +2.6 | −16.3 | — | — |
| 29 (PM 26-2) | 26.0 | −2.8 | −9.8 | 54.6 | +1.0 | −17.4 | — | — |
| 30 (PM 26-3) | 27.9 | −3.2 | −8.6 | 58.7 | +0.8 | −17.1 | — | — |
| 31 (PM 26-4) | 31.2 | −3.4 | −7.6 | 62.8 | +0.5 | −14.9 | — | — |
| 32 (PM 19-2) | 41.34 | −2.95 | −2.36 | 78.14 | 1.23 | −8.97 | — | — |

We claim:

1. A platelet-shaped colored pigment comprising a platelet-shaped substrate coated with a coating layer consisting of
   50–99% by weight of titanium oxides including titanium dioxide and at least one suboxide of titanium and
   1–50% by weight of silica,
such that the coating layer has a surface adjacent to the substrate and an outer surface, wherein the concentration of the titanium oxides in the coating layer is maximum at the surface adjacent to the substrate and gradually decreases towards the outer surface, and the concentration of silica is maximum at the outer surface and gradually decreases towards the surface adjacent the substrate.

2. The pigment of claim 1, wherein the coating layer consists of
   70–98% by weight of the titanium oxides and
   2–30% by weight of silica.

3. The pigment of claim 1, wherein the platelet-shaped substrate is a mica, kaolin or glass platelet optionally coated with one or more metal oxide layers or a metal or metal oxide platelet coated with TiO$_2$.

4. The pigment of claim 1, wherein the substrate has a diameter of 1 to 500 μm and thickness of 0.1 to 1 μm.

5. A process for preparing a platelet-shaped colored pigment, which comprises mixing a platelet-shaped substrate coated with TiO$_2$ with Si powder as a solid reducing agent to form a mixture and heating the mixture in a non oxidizing atmosphere at a temperature of more than 600° C.

6. The process of claim 5, wherein said substrate coated with TiO$_2$ and said Si powder are mixed in a weight ratio from 200:1 to 5:1.

7. The process of claim 5, wherein said substrate coated with TiO$_2$ and said Si powder are mixed in a weight ratio from 100:1 to 10:1.

8. The process of claim 5, wherein a halide is admixed with said platelet-shaped substrate coated with TiO$_2$ in an amount of from 0.1 to 40% by weight of the substrate coated with TiO$_2$.

9. The process of claim 8, wherein said halide is admixed with said platelet-shaped substrate coated with TiO$_2$ in an amount of from 0.5 to 10% by weight of the substrate coated with TiO$_2$.

10. The process of claim 8, wherein said halide is MgCl$_2$, CaCl$_2$ or CeCl$_3$.

11. The process of claim 6, wherein a halide is admixed with said platelet-shaped substrate coated with TiO$_2$ in an amount of from 0.1 to 40% by weight of the substrate coated with TiO$_2$.

12. The process of claim 11, wherein said halide is admixed to said platelet-shaped substrate coated with TiO$_2$ in an amount of from 0.5 to 10% by weight of the substrate coated with TiO$_2$.

13. The process of claim 11, wherein said halide is MgCl$_2$, CaCl$_2$ or CeCl$_3$.

14. The process of claim 5, wherein the non oxidizing atmosphere is a N$_2$ or Ar atmosphere.

15. The process of claim 5, wherein the temperature is of from more than 600° C. to 1100° C.

16. The process of claim 5, wherein the mixture is heated for 10 to 60 minutes.

* * * * *